United States Patent [19]
Forster et al.

[11] 3,771,234
[45] Nov. 13, 1973

[54] MICROWAVE DRYING PROCESS FOR SYNTHETIC POLYMERS

[75] Inventors: Eric O. Forster, Scotch Plains; Peter J. Creighton, Mendham, both of N.J.

[73] Assignee: Esso Research and Engineering Company, Linden, N.J.

[22] Filed: Sept. 9, 1969

[21] Appl. No.: 9,247

[52] U.S. Cl. .................................................. 34/1
[51] Int. Cl. ............................................. B01k 5/00
[58] Field of Search .......................................... 34/1

[56] References Cited
UNITED STATES PATENTS
3,528,179  10/1968  Smith......................................... 34/1

Primary Examiner—Charles Sukalo
Attorney—Chasan and Sinnock and Jack Matalon

[57] ABSTRACT

Volatile polar vehicles such as water or organic solvents, are removed from nonpolar materials by passing said material through at least one pneumatic conveyor resonating cavity operating at a microwave frequency of about 600 to about 50,000 MHZ. For example, a polymer such as polyvinyl chloride may be dried by conveying the polymer through said pneumatic conveyor operating at a frequency of 915 MHZ for a time sufficient to reduce the volatiles content to about 5 wt. percent and subsequently conveying the partially dried material through a second pneumatic conveyor resonating cavity operating at a microwave frequency of 2,450 MHZ for a time sufficient to reduce the polar vehicle content to below 0.5 wt. percent.

4 Claims, 4 Drawing Figures

PATENTED NOV 13 1973 3,771,234

E. O. Forster
P. J. Creighton Inventors

By Harold Einhorn Attorney

MICROWAVE DRYING PROCESS FOR SYNTHETIC POLYMERS

The resonating cavities may constitute a single pneumatic conveyor having zones operating at different frequencies, said zones being isolated from one another by microwave suppressors such as "eggcrate" type suppressors. Alternately, several pneumatic conveyor systems, each operating at a different frequency, may be used.

BACKGROUND OF THE INVENTION

This invention relates to improved drying processes. More specifically, it relates to improved devolatilizing and drying techniques utilizing microwave heating.

In conventional processes for making polymers, it is necessary to remove solvents and/or water from the polymer. For example, in the preparation of butyl rubber, a multiolefin and an isoolefin are reacted at a temperature of about −40° F. to about −160° F. in the presence of a Friedel-Crafts catalyst such as aluminum chloride. The cayalyst is ordinarily aluminum chloride in methyl chloride and the mixture of monomers, e.g. isoprene and isobutylene, contacts the catalytic solution in a tubular type of reactor at the low temperature conditions to form a slurry of butyl rubber particles in a diluent which may also be methyl chloride. The slurry is then introduced into boiling water to flash off the methyl chloride and form a slurry of butyl rubber, generally in the form of crumbs, in the water. The rubber crumb is then removed from the water slurry and dewatered on a vibrating screen or Oliver type rotary filter to about 30 to about 60 percent water by weight. It is usually further mechanically dewatered, e.g. Anderson Expeller or dewatering extruder, to a water content of about 6 to about 20 wt. percent.

An Anderson Expeller is a continuous mechanical screw press employing discontinuous worms on a shaft separated at intervals by collars and breaker lugs and operating within and through a drainage barrel made up of bars separated by thin spaces. The screw moves the material from the hopper, through the drainage barrel. As the solids move through the barrel under pressure, the liquid is pressed from the solids and permitted to escape through spaces between the bars that make up the barrel.

Thereafter, the remaining water is removed by heating. For example, the crumb is fed into a heated devolatilizing extruder in which mechanical energy and external heat provide the heat necessary to vaporize the water. The devolatilizing extruder may be equipped with a die face pelletizer. The pellets so formed are substantially free, i.e., 0.05 to 0.5 wt. percent, of water. They may be formed under water or dropped into water to cool to prevent agglomeration of the pellets. The surface water is removed by blowing with air, e.g. in a drying tunnel. The pellets are then cooled and baled, under pressure, in the manner described in U.S. Pat. No. 3,264,387 which is incorporated herein by reference.

The baling process is generally performed at a temperature of about 140° F. to about 250° F. and a pressure of about 800 to about 3,500 psi; the heat and pressure being maintained for about 5 to about 60 seconds. The resulting compacted mass has a density of about 40 to about 54 pounds per cubic foot.

Similar processes incorporating water separation and drying steps are inherent in other polymer processes. For example, styrene butadiene (GR–S) rubber is prepared as a rubber latex which is coagulated by the addition of acid or salts. The coagulated product is washed, filtered on an Oliver rotary vacuum drum filter, from which it is removed, having a water content of about 30 wt. percent to about 50 wt. percent and dried for about 20 minutes to 2 hrs. at a maximum of 82° C. to reduce the volatile matter content (i.e., water) to about 0.5 percent.

It is readily evident that large space requirements and equipment costs are needed in these conventional drying operations. Additionally, in certain processes, the heating steps are either inadequate or detrimental.

For example, the shearing action and high temperature in the devolatilizing extruder, i.e., 375°–500° F., results in polymers (e.g. PVC, butyl rubber) having molecular weight distributions skewed toward the low end. Consequently, it is only with great difficulty that, in preparing butyl rubber, can a polymer be prepared which has a weight average molecular weight ($\overline{M}_w$) to number average molecular weight ($\overline{M}_n$) greater than 5.0.

The halogenated butyl rubbers, especially brominated butyl rubber, for example, decompose at the drying temperatures used in the devolatilizer extruder. The result is the release of lacrimatory gases, e.g. HBr, and severe corrosion of equipment.

When polyisobutylene has been prepared and dried in a conventional manner, baled in the manner described in U.S. Pat. No. 3,264,387 and stored for several weeks, the bales become relatively transparent. Occluded moisture becomes visible as a large white "baseball" in the center of the bale.

Though the polymer water content is only about 0.1 to about 0.8 wt. percent, and may not affect product quality, the appearance of the bale affects customer acceptance. It is desirable therefore to remove this remaining water to give a moisture-free product. Conventional drying techniques are inadequate to further reduce the water content of the polymer.

Various polymer processing techniques have been developed utilizing electronic heating. For example, metal particles have been dispersed in a vulcanizable rubber and the mix cured by induction heating at a frequency of about 1 MHZ, e.g. see U.S. Pat. No. 3,249,658. As the name implies, induction heating operates by inducing a current in a conductor, i.e., metal filings; the heat effect depends on the eddy currents induced in the material and the heating of the rubber is by conduction from the metal filings.

Dielectric heating has been used to heat nonconductors having polar molecules. For example, polyvinyl chloride may be pressed into molding "preforms" and heated by dielectric heating prior to introduction into a compression mold. This heating technique relies on the polarity of the molecule to induce a heating effect. The material to be heated is placed between two plates which form a capacitance in an electronic circuit. The polarity of the plates is rapidly reversed at a frequency in the range of about 1 to about 150 MHZ. Heating is caused by the rapid vibration of the polar molecules attempting to align themselves with the constantly changing field.

More recently the partial curing of natural rubber or synthetic elastomers has been accomplished by passing the material through the center of a helical metal wave guide which is connected to a microwave generator running at about 300 to about 30,000 MHZ, e.g. British Pat. No. 1,065,971. Curing is completed by passing the material through a conventional heater.

Microwave heating, like conventional dielectric heating, is based on the principle that electromagnetic waves interact with a dielectric material, some of the energy associated with these waves being stored and some being dissipated. The heating effect is a funciton of the dissipated energy (dielectric loss). The dielectric loss is caused by the frictional drag associated with permanent or induced dipole orientation in the alternating electric field. Generally, polymers show an increase in dielectric loss with an increase in frequency of the radiation. Some polymers, however, e.g. PVC, actually show a decrease in dielectric loss at the higher frequencies.

Though all polymer molecules exhibit some polarity, with few exceptions, the synthetic elastomers are essentially nonpolar and hence, have a low dielectric loss. Heating of these materials is usually accomplished by the inclusion of polar materials such as fillers, i.e., carbon black.

In the conveying of polymers around the polymer plant, transfer lines are used. These transfer lines consist of pipe through which air is blown at sufficient velocity to move the polymer. These pneumatic conveyors may be pressure operated, suction systems, or a combination of the two. The design and operation of these pneumatic conveyors are well known in the art. The transfer line concept has been used in other industries to convey particulate matter, e.g. the removal of lime from railway cars.

SUMMARY OF THE INVENTION

It has been found that the volatile content of essentially nonpolar materials can be reduced to below the detectable limit of 1 ppm by means of continuous drying using microwave heating while conveying the material to be dried in a pneumatic conveyor.

Surprisingly, polymers dried by the process of this invention have improved appearance, a broader molecular weight distribution and a higher modulus of elasticity.

BRIEF DESCRIPTION OF THE DRAWING

FIG. I is a schematic of the transfer line resonating cavity of this invention wherein the transfer line is a combination pressure-suction type pneumatic conveyor.

FIG. II is a schematic of "eggcrate" type radiation suppressors.

DETAILED DESCRIPTION

Figure 1:
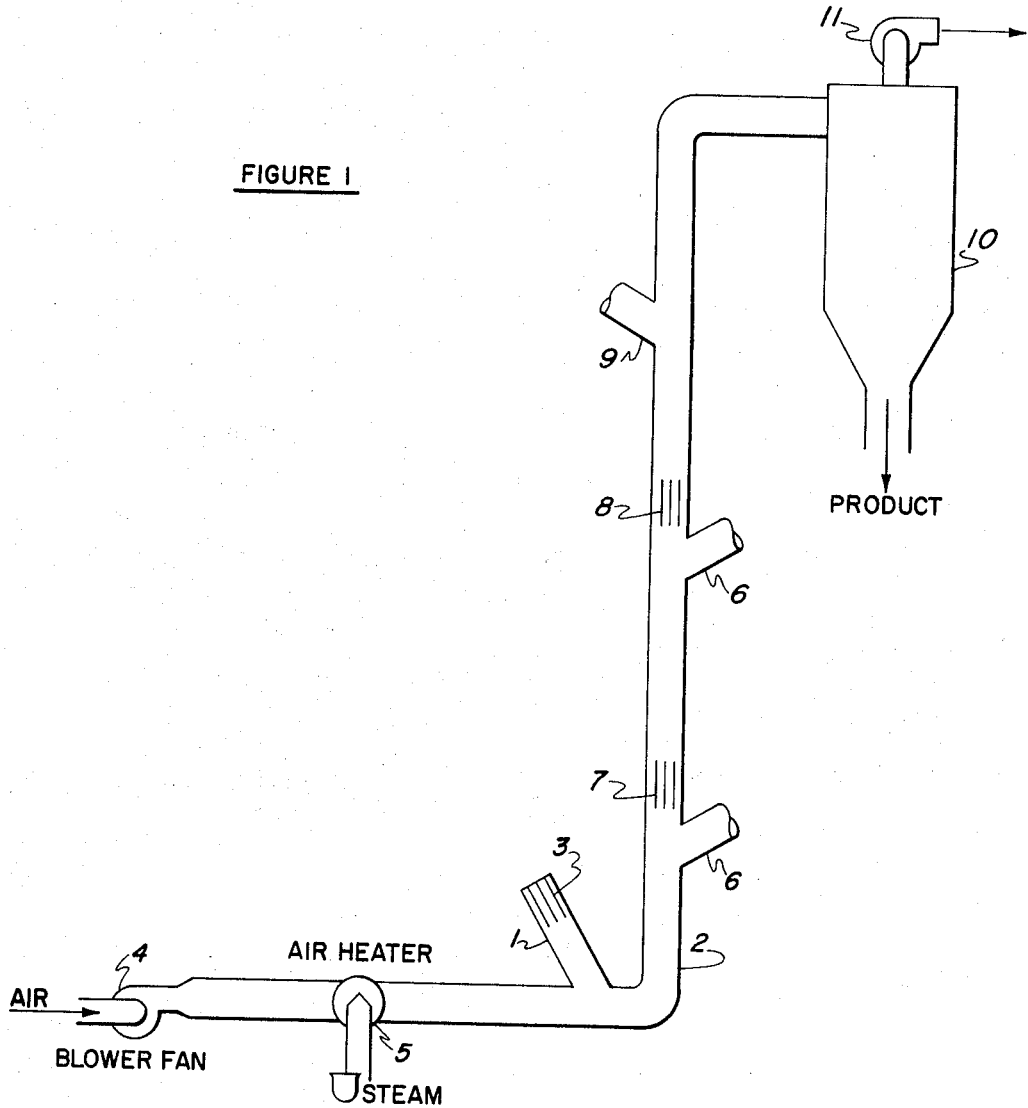
Figure 2A:
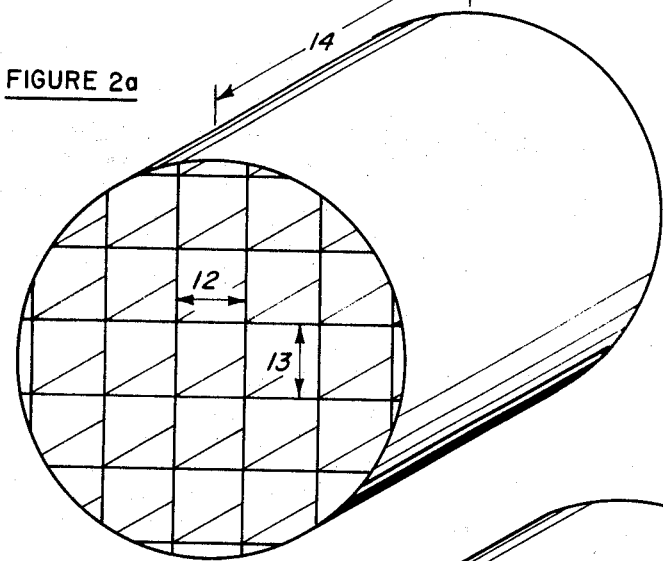
Figure 2B:
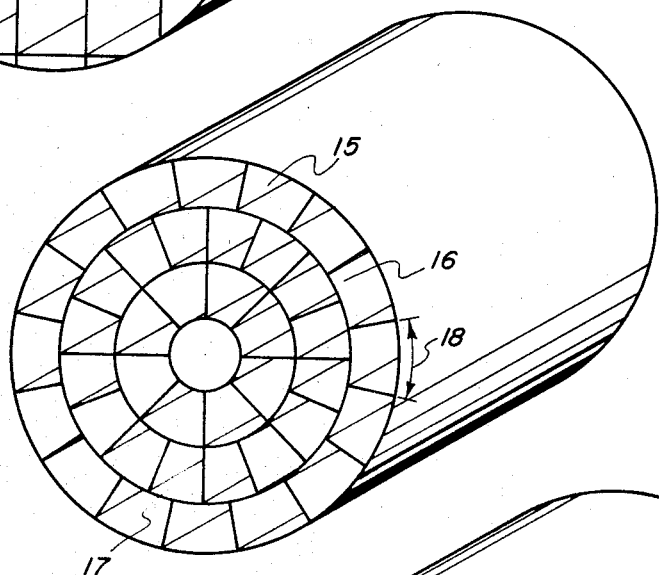
Figure 2C:
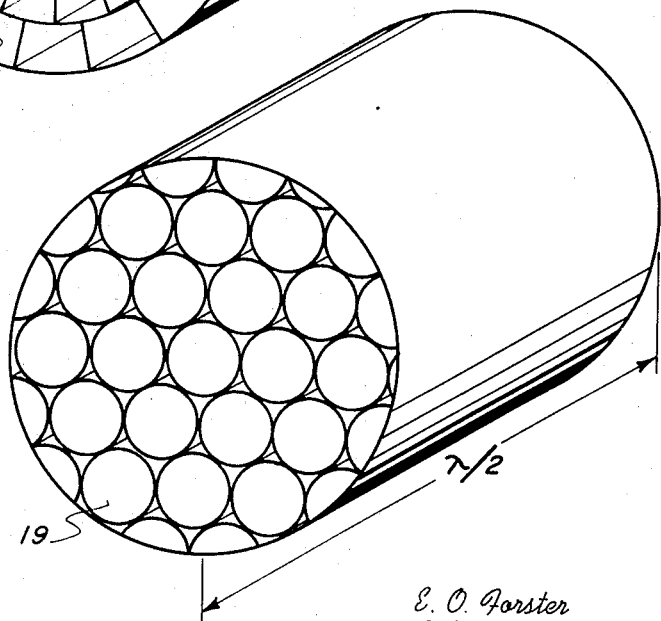

The term "transfer line" as used in the specification and claims means pneumatic conveyor and includes the accessory equipment such as blowers, suction fans, separators, valves, etc. The pneumatic conveyor consists of a duct or pipe in which an air stream is maintained by the propulsion action of a steam jet, blower or fan. There are two types, usually referred to as the pressure system and the suction system. Additionally, these two types can be combined in a single transfer system.

In the pressure system a blower forces air through the duct, and the material is fed to the duct through a rotary air-lock gate and after being conveyed, is separated from the air through a separator (such as a cyclone). In the suction system, the exhauster draws air through the duct and through a separator and duct collector. The material feeds out from the separator through the air-lock gate.

The pneumatic conveyor is suitable for granular and pulverized materials that are free flowing. The pipe diameter and blower requirements are a function of the quantity of material to be transported and its physical characteristics. The design and operation of these units is well known in the art (e.g. see F. A. Zenz and D. F. Othmer, "Fluidization and Fluid Particle Systems," Reinhold, 1960).

The term "transfer line resonating cavity" as used in the specification and claims means a transfer line into which microwave energy is introduced. The term includes the transfer line and the associated wave guides, radiation suppressors and means for introducing microwave radiation into said line, etc. to make the unit operable, as described below, within the scope of this invention.

The expression "butyl rubber" as employed in the specification and claims is intended to include copolymers made from a polymerization reactant mixture having therein about 70–99.5 percent by weight of an isoolefin which has about four–seven carbon atoms and about 30–0.5 percent by weight of a conjugated multiolefin having about four–14 carbon atoms. The resulting copolymer contains 85–99.5 percent of combined isoolefin and 0.5 to 15 percent of combined multiolefin. The term "butyl rubber" is described in an article by R. M. Thomas et al. in *Industrial Engineering and Chemistry*, Vol. 32, pp. 1,283 et seq., October, 1940.

The butyl rubber generally has a Staudinger molecular weight between about 20,000 to about 500,000; preferably about 25,000 to about 200,000; especially 45,000 to 60,000; and a Wijs iodine number of about 0.5 to about 50; preferably 1 to 15. The preparation of butyl rubber is described in U.S. Pat. No. 2,356,128, which is incorporated herein by reference.

The halogenated rubbery isoolefin-multiolefin-containing copolymers, particularly brominated butyl rubber, which are advantageously devolatilized and dried in accordance with the present invention, are produced by careful halogenation of the rubbery isoolefin-multiolefin copolymers in a manner which does not degrade the molecular weight thereof as more fully described hereinafter.

In order to produce halogenated butyl rubber, the halogenation is regulated so that the resulting rubber will contain about at least 0.5 wt. percent (preferably at least about 1.0 wt. percent) combined halogen, but not more than about "X" wt. percent combined chlorine or 3.0 "X" wt. percent combined bromine wherein:

$$X = M_3 L / (100 - L) M_1 + L(M_2 = M_3)$$

and:

L = mole percent of the multiolefin in the polymer,
$M_1$ = molecular weight of the isoolefin,
$M_2$ = molecular weight of the multiolefin,
$M_3$ = atomic weight of chlorine or bromine.

Suitable halogenating agents which may be employed are gaseous chlorine, liquid bromine, alkali metal hypochlorites or hypobromites, $C_4$–$C_{10}$ tertiary alkyl hypochlorites, sulfur bromides, sulfuryl chlorides, pyridinium chloride perchloride, N-bromosuccinimide, alpha-chloro-acetanilide, N,N'-dichloro-5,5-dimethyl hydantoin, iodine halides, trichlorophenolchloride, N-chloroacetamide, beta-bromo-methyl-pthalimide. Preferred halogenating agents are gaseous chlorine, liquid bromine, sulfuryl chloride, sulfuryl bromide, cylorohydantoins, bromohydantoins, iodine monochloride and related materials. The halogenation is generally conducted at temperatures above 0° to about +100° C., depending upon the particular halogenating agent, for about 1 minute to several hours. An advantageous pressure range is from about 0.1 to 1,000 psia, atmospheric pressure being satisfactory. The halogenation may be accomplished by preparing a 1 to 30 wt. percent solution of such polymers as above in a substantially inert liquid organic solvent such as $C_3$-$C_8$ substantially inert hydrocarbons or halogenated derivatives of saturated hydrocarbons, e.g. hexane, mineral spirits, cyclohexane, benzene, chlorobenzene, chloroform, carbon tetrachloride, mixtures thereof, etc. and adding thereto the halogenating agent which may optionally be dissolved in a substantially inert $C_3$-$C_{12}$ hydrocarbon, a $C_1$-$C_5$ alkyl chloride, carbon tetrachloride, carbon disulfide etc. If chlorine gas is employed, it may also be diluted with up to about 50, preferably 0.1 to five, times its volume of a substantially inert gas such as nitrogen, methane, carbon dioxide, etc.

The resulting halogenatad isoolefin-multiolefin-containing copolymer may be recovered by precipitation with oxygenated hydrocarbons, particularly alcohols or ketones such as acetone or any other known non-solvent for the halogenated butyl rubber and dried at about 1 to 760 millimeters or higher of mercury pressure absolute, at about 0° to 180° C., preferably at about 50° to 150° C., e.g. 70° C. Other methods of recovering the chlorinated polymer are by conventional spray or drum drying techniques.

Alternately, the solution of the halogenated rubber may be injected into a vessel containing steam and/or agitated water heated to a temperature sufficient to volatilize the solvent and form an aqueous slurry of the rubber. This halogenated rubber may be separated from the slurry by screening or filtration and recovered as a crumb. As so produced, the halogenated rubbery polymer has a Staudinger molecular weight within the range of approximately 20,000 to 500,000, preferably 25,000 to 200,000.

The term "polyisobutylene" as used in this specification is intended to mean homopolymers of isobutylene having a Staudinger molecular weight of about 60,000 to about 140,000. The particular polymerization techniques by which the polymer is made does not form an essential part of this invention.

Though GR-S type (styrene butadiene) latex is referred to in particular, it is obvious the drying technique of this invention is applicable to any latex polymerization process. The term "latex polymerization" as used in this specification includes any process in which monomers are emulsified into or suspended in a water medium during the polymerization process. The term "latex" as used in this specification includes all polymers formed by latex polymerization techniques.

The term "EPDM" as used in the specification and claims is used in the sense of its definition found in ASTMD-1418-64 and is intended to mean terpolymers containing ethylene and propylene in the backbone and a diene in the side chain. Illustrative of methods for producing these terpolymers are found in U.S. Pat. No. 3,280,082, British Pat. No. 1,030,289 and French Pat. No. 1,386,600 which are incorporated herein by reference.

The term "microwave heating" as used throughout this specification and claims means heating with electromagnetic radiation at about 600 to 50,000 MHZ; preferably about 900 to 30,000; more preferably about 900 to 3,600 MHZ; most preferably about 915 to about 2,450 MHZ.

Though application of this invention is directed primarily toward particular synthetic elastomers, it is evident that the invention disclosed herein is suitable for use in any process for making of essentially nonpolar polymer which requires a drying step to remove volatile polar solvents or water. The term "polymer" includes elastomers, plastimers, and thermoplastics. The term "essentially nonpolar" includes those materials having a dielectric loss factor of about 0.0001 to about 0.1 at the operating frequency. Although the invention is described, with particularity, in terms of drying of polymer it is readily evident that any particulate material falling within the term "essentaily nonpolar" as heretofore described may be dried by the process of this invention.

Illustrative of the types of materials may be dried by the method of this invention are:

I. Polymers
  Rubber: butyl rubber, halogenated butyl, GR-S, ethylene propylene rubber, EPDM, polybutadiene, SBR, nitrile, etc. including crumb, pellet, and sponge.
  Plastics
  PVC, polypropylene, polyethylene, polystyrene, phenolformaldehyde, ureaformaldehyde, methyl methacrylate.
II. Food Products
  Shredded coconut, seed, grains, vegetables, fruits, tapioca, whey, gelatin. corn starch, potato starch, starch byproducts, yeast filter cake, milk solids, egg solids, coffee extract, fish livers and other livers, fish, fruit pulp, distillery byproducts, breakfast food.
III. Organic materials
  Pharmaceuticals Blood, lignin, tanning extract, synthetic casein, sewage sludge, detergents, dyes, pigments, intermediates, soap flakes, lithopane, cellulose acetate.
IV. Wood, Paper, and Fibers
  Cotton linters, rayon staple, fibers, asbestos fiber, paper, wood pulp, wool, cotton, sawdust.
V. Inorganic Salts and Other Inorganic Materials
  Carbon pigment, kaolin, ceramics, silica gel, alumina, zeolites, clay, cryolite, flourspar, aluminum hydrate, titanium dioxide, aluminum stearate, calcium stearate, zinc stearate, white lead, mercuric oxide, magnesium carbonate, lead arsenate, gypsum, dyestuffs, intermediates, pigments, salts, potassium persulfate, chrome green, acid treated clay, copper sulfate, barium nitrate zinc sulfate, sodium sulfide, aluminum sulfate, magnansese sulfate, magnesium chloride.

The preferred process utilizes a transfer line of the pressure type in which the air is heated at about 140° to about 350° F. Heating of the air may be accomplished by any conventional means, e.g. steam. Preferably, microwave energy of two different frequencies is used. Frequency selection depends upon the moisture content of the material to be dried. In its preferred embodiment the process is carried out using microwave frequency of 915 MHZ where the material to be dried has a volatile content greater than 5 wt. percent and 2,450 MHZ where the volatile content is less than 5 wt. percent.

In using the process of this invention for drying of butyl rubber, for example, the polymer is separated from the methyl chloride by flashing off the methyl chloride in hot water. The aqueous slurry is then transferred to a vibrating screen. The bulk of the water is separated from the butyl rubber crumb resulting in a product containing about 60 wt. percent water which is then transferred to a further dewatering step such as an Anderson Expeller. The water content is reduced to about 6 wt. percent to about 30 wt. percent; usually about 10 to about 20 wt. percent.

Referring now to FIG. I, the butyl rubber crumb which has been reduced in water content to about 6 to about 30 wt. percent is fed via the entry line, 1, into the transfer line, 2. An "eggcrate" type of radiation suppressor, 3, is located in the entry line, 1, to prevent leakage of radiation out of the system. Air is forced through the transfer line by means of a blower 4 and is heated by a steam heater, 5. Microwave radiation is directed into the transfer line through wave guides, 6, at 915 MHZ countercurrent to the air flow. Where more than one wave guide entry point is used, they should be at least about 4–5 feet apart. Where more than one microwave generator is used, the different generators are preferably protected from feedback by additional eggcrate suppressors, 7. After about 20–100 feet of transfer line length (ca. 1–10 seconds exposure depending on air velocity), partial drying has occurred. The material to be dried passes into a zone having introduced therein microwaves at 2,450 MHZ. An "eggcrate" suppressor, 8, designed to block radiation at 2,450 MHZ is used to separate the zones of low and high frequency microwave energy. Microwave energy at 2,450 MHZ is introduced through wave guide 9. After exposure to 2,450 MHZ microwave energy for about 50–80 feet (ca. 1–3 seconds exposure) the polymer is removed from the transfer line at the cyclone separator, 10, which is adapted with an exhaust fan, 11, to aid in moving air through the transfer line.

FIG. II illustrated various types of "eggcrate" type radiation suppressors. These eggcrate suppressors comprise a series of plates at right angles. The spacing between said plates is less than $\lambda/4$ wherein $\lambda$ is the wave length of the microwave energy being used in the system. The length of the suppressor is preferably at least $\lambda/2$.

FIG. IIa shows a suppressor having a square grid installed with a pipe. The grid dimensions, 12 and 13, are not greater than $\lambda/4$ the length of the unit, 14, is at least $\lambda/2$.

FIG. IIb shows a suppressor comprising a series of radial plates, 15, intersecting concentric cylinders, 16. The annular space between cylinders, 17, is not greater than $\lambda/4$. The space between radial plates, 18, is not greater than $\lambda/4$.

FIG. IIc shows an eggcrate suppressor comprising closely packed tubes, 19, having a diameter not greater than $\lambda/4$ and a length of at least $\lambda/2$.

The microwave energy is preferably introduced into the transfer line by means of antennae loops or irises. Antennae loops or adjustable coupling loops are generally used where power is brought to the cavity by means of coaxial cable. The antennae loop is generally an extension of the center conductor of the coaxial line and protrudes into the cavity or wave guide. Irises are devices consisting of rods or sheets which protrude into the wave guide and are used for impedance matching. Adjusting the position of the rods or sheets alters the wave guide outlet dimensions and tunes the unit properly for most efficient coupling. Antennae loops, irises and their uses are well known to the art.

The advantages of this invention are more readily appreciated by reference to the following examples.

EXAMPLE 1

Drying of styrene-butadiene rubber latex (GR–S rubber) having an average moisture content of 20 wt. percent.

Equipment:
1. A 3½ inch diameter transfer line resonating cavity having a total length between inlet and discharge ports of 75 feet.
   Air flow: 235 SCFM at 250° F.
   Power: 75 KW; 5–15 KW generators equally spaced along the 75 foot run of pipe
   Operating Frequency: 915 MHZ (L-band)
2. A 3½ inch diameter transfer line resonating cavity having a total length between inlet and discharge ports of 75 feet.
   Air flow: 235 SCFM at 225° F.
   Power: 25 KW; 5–5 KW generators equally spaced along the 75 foot run of pipe
   Operating Frequency: 2,450 MHZ (S-band)

A GR–S rubber is prepared by latex polymerization. The latex is coagulated by the addition of salts to the latex suspension. The coagulated product is washed and filtered on an Oliver rotary vacuum drum filter. The rubber leaving the filter with a water content of about 20 wt. percent is fed into the L-band cavity at a rate of about 1,250 /hr. (wet). After a residence time of about 2½ seconds, the rubber exits from the L-band transfer line into the cyclone with a water content of about 5 wt. percent.

This partially dried product is fed into the S-band transfer line. After about a 1 second residence time within the transfer line, the rubber emerges from the second cyclone with a water content of less than 0.1 wt. percent and a snow white appearance. Production rate is about 1,000 /hr. or dry polymer.

EXAMPLE 2

Polyvinyl chloride containing about 18 wt. percent water is dried in an S-band (2,450 MHZ) cavity similar to the unit of Example 1 utilizing 60 KW microwave power (4–15 KW generators). To avoid thermal degradation of the polymer, the air inlet temperature is kept at 145° F. and the air flow rate is about 120 SCFM. The residence time is about 4 seconds.

The product produced at 500 /hr. has a final water content of less than 0.1 wt. percent. Its appearance is snow white in color and hence, produces a film of greater clarity than the usual product.

Though in actual practice such large quantities of water (i.e., > 5 wt. percent) would preferably be removed using both L-band and S-band conveyors in series, this example serves to demonstrate that drying by microwave heating results in a product having improved appearance.

EXAMPLE 3

In a polypropylene process the polymer, containing about 25 wt. percent atactic polypropylene and about 13 wt. percent water, is dried in the unit of Example 2. After a residence time of about 3 seconds, the product (600 /hr.) has a snow white appearance and a water content of less than 0.1 wt. percent.

EXAMPLE 4

Drying of butyl rubber having an average moisture content of 20 wt. percent.

Equipment:
1. A 3½ inch diameter transfer line resonating cavity having a total length between inlet and discharge ports of 75 feet.
   Air flow: 235 SCFM at 250° F.
   Power: 75 KW; 5–15 KW generators equally spaced along the 75 foot run of pipe
   Operating Frequency: 915 MHZ (L-band)
2. A 3½ inch diameter transfer line resonating cavity having a total length between inlet and discharge ports of 75 feet.
   Air flow: 235 SCFM at 225° F.
   Power: 25 KW; 5–5 KW generators equally spaced along the 75 foot run of pipe
   Operating Frequency: 2,450 MHZ (S-band)

Butyl rubber crumb leaving the Anderson Expeller of a butyl rubber plant, having a water content of about 20 wt. percent, is fed into the L-band cavity at a rate of about 1,250 /hr. (wet). After a residence time of about 2½ seconds, the rubber exits from the L-band transfer line into the cyclone with a water content of about 5 wt. percent.

This partially dried product is fed into the S-band transfer line. After about a 1 second residence time within the transfer line, the rubber emerges from the second cyclone with a water content of less than 0.1 wt. percent and a snow white appearance. Production rate is about 1,000 /hr. of dry polymer.

EXAMPLE 5

Butyl rubber crumb having a water content of about 5 percent is dried in the S-band conveyor of Example 1 operating at 25 KW microwave power. The air flow rate is 233 SCFM at a temperature of about 145° F. A residence time of about 1 second reduces the water content to less than 0.1 wt. percent. The product (1,000 /hr. dry weight) is snow white in the form of crumbs and when baled is clear rather than off-white or amber as is the conventionally dried material. The product had a broader molecular weight distribution (i.e., $\overline{M}w/\overline{M}n = 6$ vs. 4 for conventionally dried rubber). The broader molecular weight range makes for a more easily processed rubber.

The above example serves to illustrate that the drying of butyl rubber by microwave heating techniques results not only in greatly reduced drying time as anticipated, but produces a product having improved appearance and broader molecular weight distribution.

EXAMPLE 6

The S-band transfer line of Example 1 is operated at 25 KW microwave power and used to dry about 1,000 /hr. of wet polyisobutylene.

Polyisobutylene having a water content of about 5 wt. percent is dried to a water content of less than 0.1 wt. percent after a residence time in the cavity of about 1 second.

When the polyisobutylene of this example is baled, the bale remains clear and there is no observable indication of occluded water, i.e., white "baseballs."

Although the drying technique of this invention makes it possible, where necessary, to reduce the volatiles content of a polymer to below the detectable limit, e.g. <1 ppm, those skilled in the art are aware that in many cases it is sufficient to reduce the volatiles content, e.g. water, of synthetic polymers to less than 5,000 ppm, more preferably about 3,000 ppm. The advantages of this invention are still obtained where drying is suspended at these higher levels of volatiles content, e.g. 3,000 ppm.

For example, the polymer bulk temperature under these conditions is only about 180°–190° F. as compared to about 375°–500° F. when conventional techniques are used for drying butyl rubber to these levels. As has been pointed out, the advantages obtained as a result of the lower temperatures are improved appearance, e.g. snow-white rather than off-white or amber color, and broader molecular weight distribution. Additionally, the polymers exhibit higher tensile strengths and moduli of elasticity.

Though the process has been described in terms of removing water, it is evident that it is applicable to any polymer process which requires the removal of a vehicle so long as the vehicle (water or organic solvent) is polar. The wet polymer need only be delivered as a powder, crumb or pellet to the microwave installation. The term "polar vehicle" as used in this specification and claims means water or a polar organic solvent, i.e., organic solvents with a dielectric constant greater than 4.0.

Since many different embodiments of this invention may be made without departing from the spirit and scope thereof, it is to be understood that the present invention is not limited to the embodiments specifically disclosed in this specification thereof.

What is claimed is:

1. An apparatus for microwave drying which comprises:
   a. a first transfer line section having an inlet equipped with a radiation suppressor;
   b. means for introducing into said first section microwave energy at 915 MHZ at at least one point in said first section said microwaves being directed toward the inlet of said section;
   c. a second transfer line section communicating with said first section and isolated therefrom by means of an eggcrate radiation suppressor;
   d. means for introducing into said second section microwaves at 2,450 MHZ at at least one point in said line; and
   e. an exit port.

2. In a process for preparing an essentially nonpolar synthetic polymer utilizing a polar vehicle from which said polymer is separated, the improvement which comprises:
   a. transferring the polymer vehicle to a first transfer line resonating cavity operating at a microwave frequency of 915 MHZ;
   b. conveying said polymer through said cavity for a period of time sufficient to reduce the vehicle content of said polymer to less than 5 wt. percent;

c. transferring the partially dried polymer to a second transfer line resonating cavity operating at a frequency of 2,450 MHZ;
d. conveying said polymer through said second cavity for a period of time sufficient to reduce the vehicle content to less than 5,000 ppm; and
e. recovering the substantially dried polymer.

3. The process of claim 2 wherein said polymer is conveyed through said resonating cavities for a time sufficient to reduce the polar vehicle content of said polymer to less than 10 ppm.

4. The process of claim 2 wherein the material is a synthetic polymer selected from the group consisting of GR–S rubber, polyvinyl chloride, propylene, polyisobutylene, ethylene-propylene copolymers, EPDM, and mixtures thereof.

* * * * *